United States Patent [19]

Greutert et al.

[11] 4,259,283
[45] Mar. 31, 1981

[54] MANUFACTURE OF A SIEVE HAVING SUBSTANTIALLY PLANE SIEVE SHEETS

[75] Inventors: Albert Greutert, Sachseln; Ernst Stumvoll, Sarnen, both of Switzerland

[73] Assignee: Elfo AG Sachseln, Switzerland

[21] Appl. No.: 31,889

[22] Filed: Apr. 20, 1979

Related U.S. Application Data

[63] Continuation-in-part of Ser. No. 721,632, Sep. 8, 1976.

[51] Int. Cl.³ ............... B29D 23/00; B29C 27/00; B21D 35/00
[52] U.S. Cl. .................... 264/152; 29/460; 29/469.5; 29/530; 264/156; 264/263; 264/273; 264/DIG. 70
[58] Field of Search ........ 264/263, 273, 275, DIG. 70, 264/152, 153, 156, 277; 29/460, 469.5, 530

[56] References Cited

U.S. PATENT DOCUMENTS

| | | | |
|---|---|---|---|
| 2,285,963 | 6/1942 | Gito et al. | 264/275 |
| 2,763,032 | 9/1956 | Fay | 264/275 |
| 3,096,146 | 7/1963 | Coale | 264/275 |
| 3,359,002 | 12/1967 | Wolf | 264/273 |
| 3,408,438 | 10/1968 | Staunton | 264/273 |
| 3,719,222 | 3/1973 | Harding et al. | 264/273 |

FOREIGN PATENT DOCUMENTS

| | | | |
|---|---|---|---|
| 2153901 | 3/1973 | Fed. Rep. of Germany . | |
| 866276 | 7/1941 | France | 210/149 |
| 1098513 | 8/1955 | France . | |
| 64152 | 11/1955 | France | 210/499 |
| 744918 | 12/1955 | United Kingdom | 210/499 |

*Primary Examiner*—James B. Lowe
*Attorney, Agent, or Firm*—Townsend and Townsend

[57] ABSTRACT

The invention relates to a method of manufacturing a sieve which is composed of several planar sieve sheet sections, which are lying adjacent each other and are separated by a plurality of slots and are communicating with one another at a common point. The sieve sheet sections when so arranged are placed into a mold, and thereafter plastics material is introduced into the mold to form ribs that are covering the slots and that are holding in place and stiffening the rims of the sections that form a slot. The sieve sheet may be formed as an integral part or alternatively may be made of several sieve sheet sections that are held together at the peripheral region by connecting means. The plastics ribs covering the slots may be integrally formed with a container holding the sieve sheet.

6 Claims, 4 Drawing Figures

MANUFACTURE OF A SIEVE HAVING SUBSTANTIALLY PLANE SIEVE SHEETS

RELATED APPLICATIONS

This Continuation-In-Part application corresponds to U.S. Ser. No. 721,632, filed Sept. 8, 1976.

BACKGROUND OF THE INVENTION

It is already known to manufacture a sieve having at least one substantially plane sieve sheet by embedding the rim of the sieve sheet in a rib of plastics material. It is also known to provide stiffening ribs extending across the surface of the sieve sheet. However, such sieves are expensive in manufacture, and the stiffening ribs do not prevent warping of the sieve sheet.

It is also known to manufacture a sieve that is composed of a plurality of individual sieve sections which are joined by plastics ribs. Such planar sieve structures do not prevent warping, too (GB Pat. No. 741,918).

SUMMARY OF THE INVENTION

It is an object of the invention to provide a method for manufacturing a sieve having at least one substantially plane sieve surface having a high rigidity and a low tendency to deformation.

Another object of the invention is the provision of a method for manufacturing a sieve having at least one substantial plane sieve sheet, which is provided with radially extending separating slots which are arranged in such a configuration that the slots are communicating with one another at one of their ends.

Still another object is the provision of a method for manufacturing a sieve having a planar sieve section and a plastics container forming an integral part with the stiffening ribs.

Those and other objects of the invention will become appararent from the following description of a preferred embodiment, which in no way is to be considered as limitative, in combination with the accompanying drawings.

DETAILED DESCRIPTION OF A PREFERRED METHOD

It should be noted that the term "plane" used throughout the specification is intended to designate an even or plane configuration of a sieve sheet as well as a slightly pyramidal or conical configuration of the same, which lastmentioned configuration only serves to counteract the tendency of warping of the sieve sheet and may be undiscernable to a user.

Figure 1:
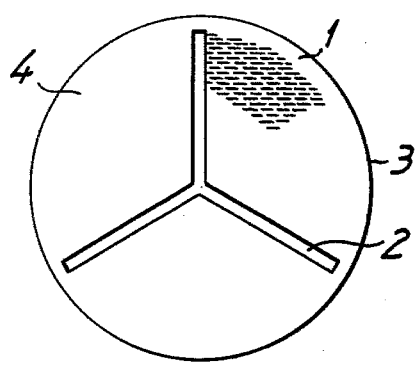
FIG. 1 is a top view of a generally plane sieve sheet having radially extending slots.

One of the steps of manufacturing a sieve comprises forming a substantially planar sieve sheet that is provided with slots. FIG. 1 shows such a generally plane circular sieve sheet 1 which is provided with three radially extending slots 2 which extend from the center to the periphery 3 of the sieve sheet and which are communicating with one another at the center. These slots allow the three sectorial segments 4 which are defined by the slots 2 to be bent out of a plane. The circular sieve sheet 1 shown in FIG. 1 may be made by a stamping operation or by electrodeposition of a metal on a matrix that conforms to the configuration of the sieve.

Figure 2:
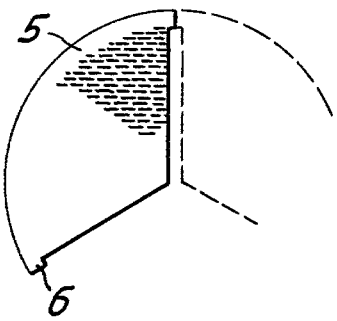
FIG. 2 is a top view of a sieve sheet made of three individual sieve segments.

Alternatively, the plane sieve sheet may be made of a plurality of individual sieve sections, as is shown in FIG. 2, in which the sieve sheet is formed of three identical, individual sieve sections having an arcuate rim portion and two straight rim portions forming an angle of 120° with one another. The ends of the arcuate rim portion are provided with connecting tongues or protrusions 6 which serve to connect adjacent sieve segments 5 with one another. This may be done in any known way, for instance by spot-welding or by providing holes in the connecting tongues adapted to receive rivets for connecting adjacent sieve segments.

The sieve sheet shown in FIG. 2 has the advantage that the sieve segments 5 may be produced with a minimum of scrap when being punched from sheet metal, and that the covering of a master plate when manufacturing the sieve segments by electro-deposition, is increased in comparison to circular sieves.

Figure 3:
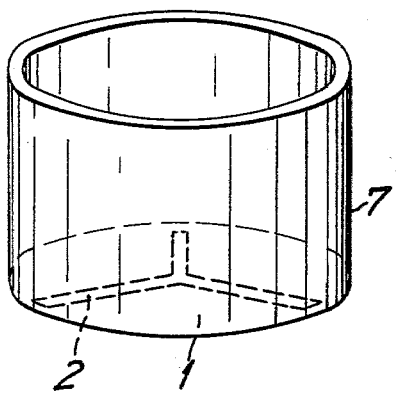
FIG. 3 is a perspective view of a sieve having a plane sieve sheet and a plastics container affixed thereto.

FIG. 3 shows a sieve sheet and a plastics container affixed thereto manufactured according to the invention. The sieve sheet when formed according to FIG. 1 or FIG. 2 is embedded in the lower rim of the cylindrical plastics container 7, which is formed concurrently with the ribs that are covering the slots 2.

Figure 4:
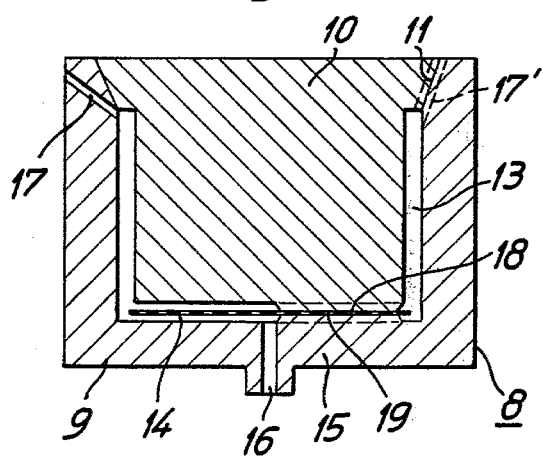
FIG. 4 is a longitudinal section through a mold for manufacturing the sieve as shown in FIG. 3.

FIG. 4 shows a mold for manufacturing the sieve shown in FIG. 3. The mold 8 comprises an outer, pot-shaped element 9 and an inner, generally cylindrically shaped element 10.

The outer element has at its upper part a frusto-conically shaped shoulder 11, which is adapted to form an abutment, against which a complementarily formed outer rim of the inner elements 10 may but. Both elements of the mold, when put together as shown in FIG. 4, confine a cylindrical cavity 13, which conforms to the shape of the container 7, and three radially extending strut-like cavities 14, one of which being shown in FIG. 4, which cavities are in communication with one another in the central region of the mold and which are in communication with the cylindrical cavity 13, too. The bottom 15 of the outer element 9 is provided with a central opening 16, which is in communication with the radially inner ends of the strut-like cavities 14 and which serves to inject plastics material at a relatively high pressure into the cavity.

At least one bore 17 may be provided in one of the elements of the mold at a location distant from the injection port 16. Alternatively, one or more bores 17' may be provided in the region of the shoulder 11 and the outer rim, as is shown in FIG. 4 by dashed lines.

Both elements 9 and 10 of the mold have surface sections 18 and 19, respectively, which extend between the strut-like cavities 14 and which, when the elements 9 and 10 are fitted together, have a constant clearance from one another which equals the thickness of the sieve sheet.

In order to manufacture a sieve as shown in FIG. 3, a sieve sheet as shown in FIG. 1 or 2 is placed into the interior of the outer element 9 of the mold and onto the bottom of the same. Thereafter, the inner element 10 is placed into the outer element so as to form a closed mold, as shown in FIG. 4. Surface sections 18 and 19 butt against the sieve sheet. Plastics material is now injected through the injection port 16 at a relatively high pressure and penetrates through the strut-like cavities 14 and into the cylindrical cavity 13, until these cavities are completely filled. The plastics material is allowed to cure or harden, and thereafter the inner element 10 is removed and the strainer stripped off.

It should be noted that the surface sections 18, and 19 of the outer element 9 and the inner element 10, respectively, form the side faces of a tetraeder or pyramid, the height of which is small in comparison to the diameter, for instance between 1 and 5% of the same. By this, the sieve sheet of the strainer has a minimum tendency of warping.

We claim:

1. A method for manufacturing a sieve having at least one substantially planar sieve surface, comprising the steps of providing a sustantially planar sieve sheet having substantially uniform perforations, forming a plurality of slots in said sieve sheet extending across the surface thereof and arranged in such a configuration that said slots are communicating with one another at one of their ends, placing the slotted sieve sheet into a mold having rib-like cavities which are arranged so as to register with said slots, introducing a curable plastics material into said mold and into the cavities so that plastic material in the cavities protrudes through and fills the slots and engages and rigidly interconnects opposing edges of the sieve sheet defining the respective slots, allowing said plastics material to cure, and removing the so formed sieve from the mold.

2. A method as claimed in claim 1, wherein the slots divide the sieve sheet into a plurality of separate sieve sections, and including the steps of interconnecting the sections, and thereafter placing said interconnected sieve sections into the mold, and slightly deflecting the sections from their substantially planar position.

3. A method according to claim 1, wherein said sieve sheet has a round configuration, and wherein the slots are formed in a substantially radial configuration.

4. A method for manufacturing a sieve having at least one substantially planar sieve surface, comprising the steps of providing a plurality of individual sieve sections having a contour such that when said sieve sections are placed adjacent each other, a plurality of slots are formed by parts of the circumference of said sieve sections, the slots defining a common point at which they communicate with one another, connecting the sieve sections so that they form a unitary sieve sheet, thereafter placing the sieve sheet into a mold having rib-like cavities registering with said slots, introducing a curable plastics material into said mold at said common point, flowing the plastics material into the cavities and through the slots into contact with the respective parts of the peripheries to thereby interconnect and secure to each other said respective parts of the peripheries, allowing said plastics material to cure, and removing the so formed sieve from said mold.

5. A method according to claim 1, including the steps of forming a plastics container connected with the sieve by providing a mold having a cavity conforming to the desired plastics container and communicating with the circumference of said planar sieve sheet, and introducing said curable plastics material into said mold at a point where said slots are communicating with one another.

6. A method for constructing a sieve defined by a container and a sieve sheet mounted to the container comprising the steps of: providing a sieve sheet constructed of a sustantially rigid material; forming a plurality of slots extending through the sheet and dividing the sheet into a plurality of contiguous sheet sections, the slots converging at a common point and extending from the point towards the periphery of the sheet; devising a connection between adjacent sections and across corresponding slots to maintain adjacent sections secured to each other, deflecting the sections from a common plane by a relatively minor amount; thereafter flowing a plastics material from the common point into the slots and around the periphery of the sheet into a substantially tubular configuration extending transversely from the sheet to thereby fill the slots with the plastics material and form the container and embed edges of the sheet defining the slots in plastics material; and continuing the step of deflecting until the plastics material in the slots has hardened, whereby the hardened plastic material forms a rigid interconnection across the respective slots between corresponding, opposing edges of the sections.

* * * * *